United States Patent [19]

Williamson et al.

[11] 3,709,384

[45] Jan. 9, 1973

[54] LOADING UNITS FOR MACHINE TOOLS

[75] Inventors: David T. N. Williamson; James Moffat, both of Hutchinson; William Wood; Peter Holland, both of London, all of England

[73] Assignee: Molins Machine Company, Limited, London, England

[22] Filed: Dec. 14, 1970

[21] Appl. No.: 98,092

Related U.S. Application Data

[63] Continuation of Ser. No. 721,034, April 12, 1968, abandoned.

[30] Foreign Application Priority Data

May 5, 1967 Great Britain.....................21,104/67

[52] U.S. Cl.............................214/16.4 R, 198/107
[51] Int. Cl..............................................B65g 1/06
[58] Field of Search...214/132, 16.1 DB, 730, 16.4 R

[56] References Cited

UNITED STATES PATENTS

2,602,557 7/1952 Sinclair..........................214/16.1 DB
3,055,517 9/1962 Kirkland.......................214/16.1 DB

Primary Examiner—Gerald M. Forlenza
Assistant Examiner—R. B. Johnson
Attorney—Emory L. Groff and Emory L. Groff, Jr.

[57] ABSTRACT

Workpiece-holding pallets and tool magazines are transferred between loaders and a numerically controlled machine tool by pushers on a horizontal beam movable lengthwise to effect such transfer, and movable transversely of its length between three positions at one of which the pushers can engage a pallet, and possibly also a tool magazine, at another of which the pushers can engage only a tool magazine, and at the third of which the pushers are clear of both pallets and tool magazines. The loaders are paddle members which can be rotatable to locate a selected paddle at a loading position.

18 Claims, 14 Drawing Figures

LOADING UNITS FOR MACHINE TOOLS

This application is a streamlined continuation of Ser. No. 721,034 filed Apr. 12, 1968 and now abandoned.

This invention concerns improvements in or relating to loading units for machine tools.

According to the present invention there is provided a loading unit for a machine tool comprising support means to support an article at a loading position in substantial alignment with article receiving means in the machine tool; pusher means mounted for movement in a direction to effect transfer of an article between said loading position and said receiving means, and mounted for movement transversely of said direction between a first position, at which the pusher means can engage an article to effect such transfer, and a second position, at which the pusher means is clear of and can move past an article when the pusher means is moved in said direction. Means are also provided to move the pusher means in said direction, and to move the pusher means transversely of said direction between the first and second positions. The article may be a workpiece holder, such as a pallet, or may be a tool magazine.

The pusher means may comprise a beam member having a pusher element mounted thereon; the beam member being adapted to move lengthwise in said direction, and to move transversely of its length between a first position and a second position.

The loading unit may comprise first support means to support a first article, such as a workpiece holder, at a loading position in substantial alignment with first receiving means in the machine tool, and second support means to support a second article, such as a tool magazine, at a loading position in substantial alignment with second receiving means in the machine tool; the pusher means being adapted to be capable of engaging the first article and effecting transfer thereof between the first support means and the first receiving means and to be capable of engaging the second article and effecting transfer thereof between the second support means and the second receiving means. The pusher means may be adapted, when in the first position, to effect simultaneous transfer of the first and second articles, and may be movable transversely of the direction to a third position at which the pusher means can engage and transfer one of the articles without engaging the other.

The support means may be adapted to carry a plurality of articles and may be movable to locate a selected article at the loading position. For example, the support means may comprise a rotatable member having paddles, each of which can carry at least one article, and means to rotate the member to locate a selected paddle at the loading position.

Apparatus in accordance with the invention will now be described, by way of example, with reference to the accompanying drawings, in which.

The mechanism and devices described herein are also described in use in a machine tool installation in U.S. Pat. application Ser. No. 695,817 and in the following description the mechanism and devices are described as used in such an installation.

Figure 1:
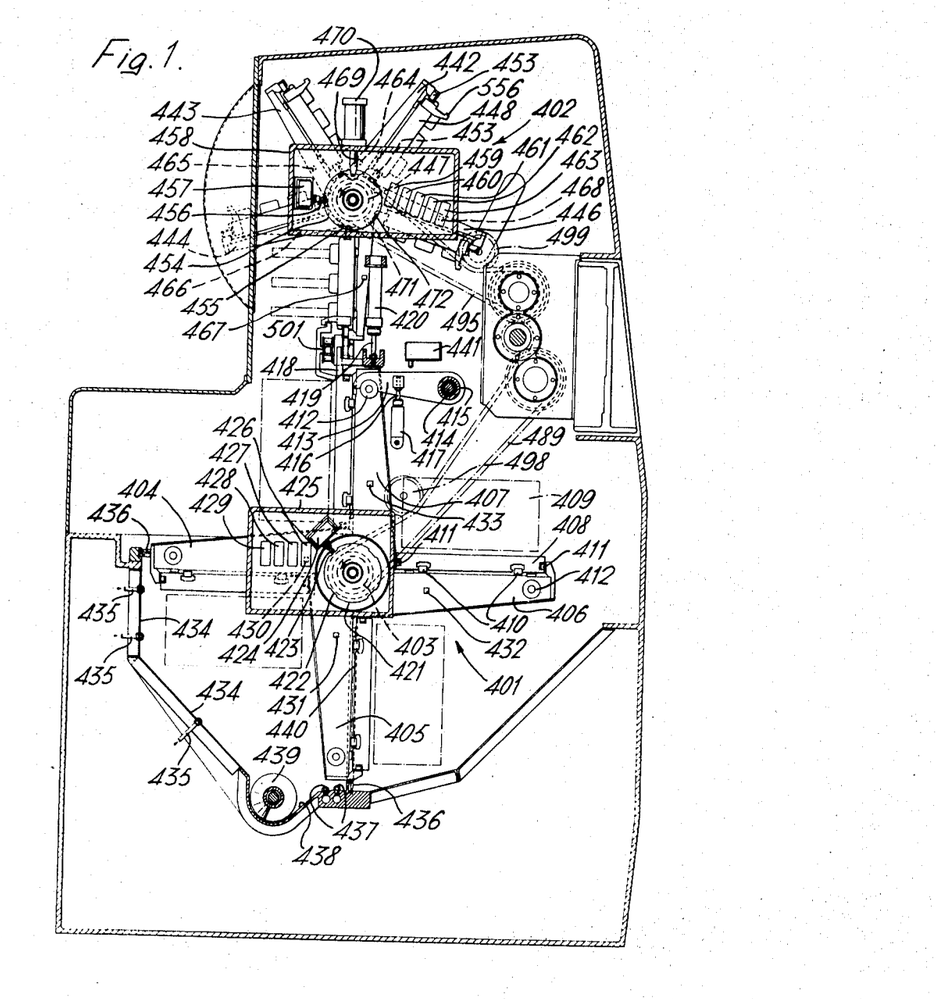
FIG. 1 is a sectional view through a loading unit associated with a machine tool and comprising a pallet holder or loader and a tool magazine holder or loader.

A loading unit associated with a numerically-controlled twin spindle machine tool and comprising a pallet holder or loader 401 and a tool magazine holder or loader 402 is shown in FIG. 1.

The pallet loader comprises a rotatable horizontal shaft 403 on which are mounted four substantially radial paddle members 404–407 spaced at 90° intervals and each adapted to carry a pair of pallets. Pallets are delivered to and received from the loader in linked pairs and have identifying numbers as described in the above mentioned application and explained below. In FIG. 1 the pallets are indicated by the reference 408 and workpieces loaded on them (shown in broken line) by the reference 409. Each paddle 404–407 has projecting rollers 410, which locate in "T" slots in the base of the pallets, and further projecting end rollers 411, which locate in grooves in the side of the pallets. The rollers 410 and 411 are arranged in lines parallel to the axis of shaft 403 so that pallets can be moved on to and from a paddle by running the slots and grooves in the pallets along the rollers. The rollers 410 and 411 further serve to hold a pair of pallets on the paddle while the loader is rotated.

Figure 14:
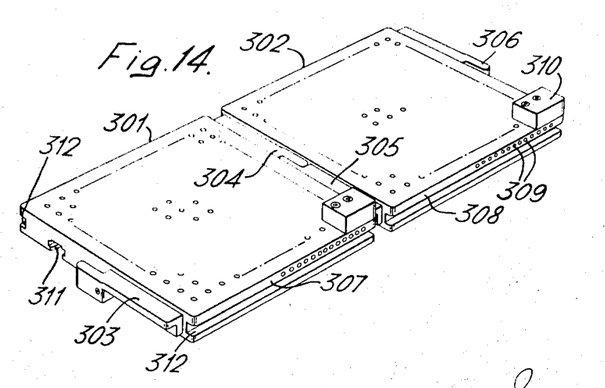
FIG. 14 is a perspective view of a pair of linked pallets.

A pair of linked pallets 301 and 302 is shown in FIG. 14. The pallet 301 is provided with side lugs 303 and 304, and the pallet 302 has similar side lugs 305 and 306, the pallets being linked by engagement of the lugs 304 and 305 to provide a linked pair with the lugs 303 and 306 projecting at the ends. Each pallet has its identifying number (the numbers of the two pallets of a pair being the same) on one side (the sides 307 and 308 respectively) in the form of thirteen holes 309 each containing either a magnetic plug or a non-magnetic plug. Different identifying numbers are achieved by fitting magnetic plugs in different combinations of one or more holes, or, in other words, the numbers are based on a binary code with a magnetic plug indicating one and a non-magnetic plug zero. When the pallet pair is placed opposite a reading head the identifying number can be read and a corresponding signal fed back to an on-line computer. The pallets are always stationary relative to the read head whenever the pallet numbers are read to avoid the difficulty that the number read off would depend on the direction of travel of the pallet relative to the read head. It will be noted that the pallets 301 and 302 must be linked in one of two ways to keep the sides 307 and 308 bearing the numbers facing the same way, i.e., by either linking the lugs 304 and 305, as shown, or the lugs 303 and 306, and that the pallets must not be linked by engaging the lugs 303 and 305 or the lugs 304 and 306. FIG. 14 also shows the previously mentioned "T" slots 311 in the base of the pallets and the side grooves 312, as well as datum pads 310 provided for a purpose described in the above mentioned application.

Each paddle 404–407 has a roller 412 mounted on one side near its outer end and at the upper vertical position (shown as occupied by the paddle 407) is a hook member 413 which can engage with this roller. The member 413 can pivot about a shaft 414 provided with a rubber bush 415, and can be moved upwardly by a rod 416 connected to the member 413 and operated by a hydraulic cylinder 417 containing a spring which urges the rod 416, and hence the member 413, downwardly.

Also adjacent the upper vertical position of a paddle 404–407 is a read-head device 418 which can be moved up and down by a rod 419 connected to it and operated by a two-way hydraulic cylinder 420. At its lower position (shown in FIG. 1) the read head device 418 can read the identifying number on the sides of the pair of pallets carried by the upper vertical paddle (shown as 407).

Connected to the shaft 403 for rotation therewith is a boss 421 having four peripheral detents 422. A roller 423, mounted on a micro-switch 424 in a fixed housing 425, can enter these detents and operate the switch 424. The housing 425 also carries four further microswitches 426–429, spaced at different distances from the shaft 403, which can respectively be operated by small projections 430–433 on the side of the paddles 404–407 and spaced at corresponding distances from the shaft 403. Thus, which of the switches 426–429 is operated depends on which paddle 404–407 is at the left hand horizontal position as viewed in FIG. 1.

Extending between the left hand horizontal position (shown occupied by the paddle 404) and the lower vertical position (shown occupied by the paddle 405) is a cover 434 accommodating air pipes 435 from which jets of compressed air are directed against the pallets and workpieces on the paddle at the left hand horizontal position and during their travel towards the lower vertical position. Brushes 436 are also provided at these two positions and further air jets 437 are arranged adjacent the brushes 436 at the lower vertical position. The air jets and brushes serve to remove swarf and foreign matter from the pallets and workpieces and the paddles, the swarf, etc., falling into a channel 438 from which it is fed by a rotating archimedian screw 439 to a swarf disposal area in the machine tool. Each paddle 404–407 is provided with a brush 440, shown on the paddle 405, which brushes the base or back of a pair of pallets as they are moved across the paddle.

Adjacent the hook member 413 is a switch 441 which is operated when the member is raised, the switch being of a type such that when it is first pressed it engages a clutch in the drive (later described) to the shaft 403, and when it is next pressed it disengages the clutch.

The operation of the pallet loader is as follows.

Pairs of pallets are delivered to and received from the paddles 404–407 when stationary and at the right hand horizontal position as viewed in FIG. 1, which is shown occupied by the paddle 406, by a transporter in a manner as described in the above mentioned application. Normally the transporter first withdraws from the paddle at that position the pair of pallets on the paddle and loaded with workpieces which have been machined, and then delivers to the paddle a pair of pallets loaded with workpieces to be machined. Pairs of pallets are fed into the machine tool for machining, and received from the machine tool after machining, at the upper vertical position shown occupied by the paddle 407, the paddle remaining at that position during the machining operations. The loader is rotated anti-clockwise as viewed in FIG. 1 (by driving means later described and operable at two speeds) through 270° stages in 90° steps. Thus each 270° stage moves the pair of pallets, bearing workpieces which have just been machined, received on the upper vertical paddle to the right hand horizontal position ready for withdrawal by the transporter 114. During this travel the pallets and workpieces pass through the left hand horizontal and lower vertical positions and are therefore inverted, and cleaned by the air jets 435 and 437 and brushes 436. A pair of pallets delivered to a paddle at the right hand horizontal position pass through three 270° stages before they arrive at the upper vertical position for delivery into the machine tool. Thus, starting from the paddle positions shown in FIG. 1, the first 270° stage brings the paddle 404 to the upper vertical position, the second 270° stage the paddle 405, and the third 270° stage the paddle 406. During this travel the pallets and workpieces pass through the cleaning area of the air jets 435 etc. and the back of the pallets is cleaned by the brush 440 on the paddle as they are moved into the machine tool. By this arrangement a buffer store of two pairs of pallets bearing workpieces awaiting machining and one pair of pallets bearing workpieces which have been machined can be provided between the transporter and the machine tool, so that operation of the latter is not delayed through other operational commitments of the former.

Movement through the 90° steps is effected as follows. The hook 413 is raised, thereby operating the switch 441 and engaging the clutch of the drive means to rotate the loader at its faster speed (about 15 r.p.m.). When the roller 423 drops into a detent 422 the microswitch 424 reduces the drive to its lower speed (about 2½ r.p.m.) and releases the hydraulic pressure in the cylinder 417 so that the hook 413 is spring urged downwardly. The lower surface of the hook member 413 then acts as a brake against the roller 412 on the paddle approaching the upper vertical position. This roller raises the hook member until the latter operates the switch 441, thereby disengaging the clutch of the drive means so that the paddle free wheels until it is arrested by engagement of the hook 413 with the roller 412. The switches 426–429 then feed back a signal indicative of the position of the paddles, determined by which of the switches is operated, and if the paddle at the upper vertical position is not the one from which the next pair of pallets is to be fed into the machine tool, i.e., if the 90° step just completed does not end a 270° stage, the hydraulic cylinder 417 is operated to start another 90° step.

At the end of each 270° stage i.e., after three 90° steps, the hydraulic cylinder 420 is operated to lower the read head 418, which can then read the identifying number of the pair of pallets about to be fed into the machine, and which can again read this number when the pallets are received from the machine tool after machining. Such readings are used to initiate further operations explained later. The read head is then raised before commencing the next 270° stage.

It will be appreciated that, instead of rotating the loader in 90° steps, provision could be made to override the switch 424 except on completion of 270° stages. It will further be appreciated that, although the loader is normally rotated through 270° stages, it can be rotated through any desired number of 90° steps if particular circumstances require pallets to be delivered to or from a particular paddle displaced from the delivery position by other than 270°. Thus, in particular, a pallet loader associated with a single spindle machine tool is required, as explained later, to rotate through stages other than 270°.

Figures 2, 3:
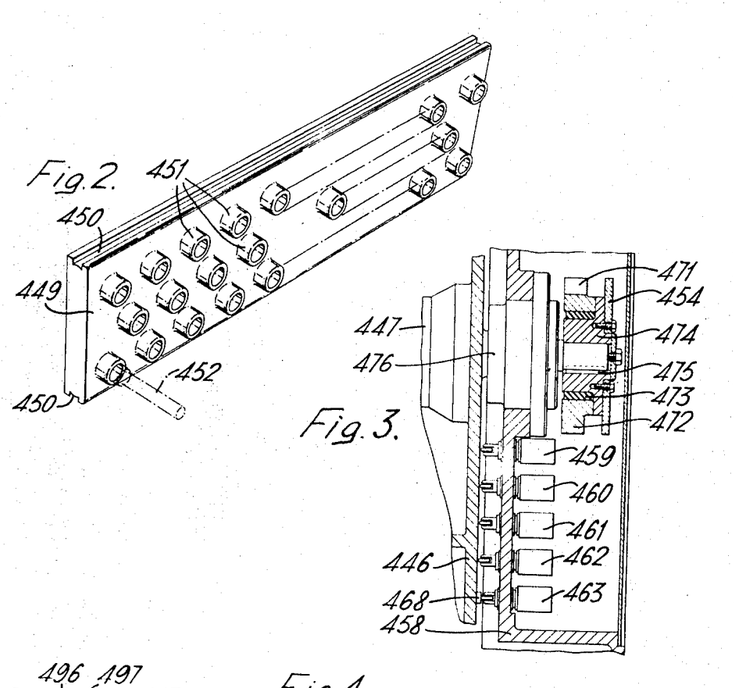
FIG. 2 is a perspective view of a tool magazine.
FIG. 3 is a sectional view through part of the tool magazine loader shown in FIG. 1.

The tool magazine loader 402 is generally similar to the pallet loader 401 but comprises five substantially radial paddle members 442–446 mounted on a horizontal rotatable shaft 447. Each paddle is adapted to carry one tool magazine 448. A tool magazine is shown in FIG. 2 and comprises a plate-like base 449 having side grooves 450 and twenty eight projecting sockets 451 each of which can hold one tool (indicated in broken line as 452). The magazine has an identifying number, in the same form as described above in relation to pallets, on one side of the base 449 not visible in FIG. 2. Each magazine also has a hook 556, not shown in FIG. 2, for a purpose described later. Each of the paddles 442–446 has end rollers 453 which are arranged in lines parallel to the shaft 447 and locate in the magazine side grooves 450 so that the magazine can run between the rollers 453 as it is delivered to or from the paddle, the rollers further serving to hold the magazine on the paddle.

The shaft 447 carries a boss 454 (see also FIG. 3) having five detents 455 which a roller 456 mounted on a microswitch 457 can enter to operate the switch in a manner similar to and for the same purpose as that described in relation to the boss 421 and switch 424 of the pallet loader. The switch 457 is mounted in a fixed housing 458 which also carries five further switches 459–463 spaced at different distances from the shaft 447 which are operated respectively by projections 464–468 on the side of the paddles 442–446. These further switches 459–463 correspond to and act in the same way as the switches 426–429 on the pallet loader.

The mechanism for holding the tool magazine loader stationary differs from the hook 413 arrangement provided for the pallet loader and comprises a plunger 469, operated by a double-acting hydraulic cylinder 470, and adapted to be inserted in peripheral slots 471 in a boss 472 connected to the shaft 447 for rotation therewith. As can be seen in FIG. 3, the boss 472 is mounted on a rubber bush 473 round a member 474 keyed to a stub shaft 475 which passes through bearings 476 in the housing 458 and is connected to the shaft 447. The boss 454 is also fixed to the member 474.

The operation of the tool magazine loader is as follows.

Tool magazines are fed into and received from the machine tool at the lower vertical paddle position shown occupied by the paddle 445. Tool magazines are also withdrawn from and delivered to the magazine loader by a transporter at this lower vertical paddle position, in a manner as described in the above mentioned application.

The magazine loader is rotated anticlockwise as viewed in FIG. 1 (by drive means described later and operable at two speeds) in 72° steps. A step is commenced by operating the cylinder 470 to raise and withdraw the plunger 469 from its position shown in FIG. 1. As it is raised the plunger operates a clutch operating a micro switch not shown, but similar to the switch 441 on the pallet loader, which engages a clutch in the drive causing the loader to rotate at its faster speed (about 15 r.p.m.). When the roller 456 drops into a detent 455 it operates the switch 457 to reduce the rotation to the lower speed (about 2½ r.p.m.) and as the paddles approach the end of the 72° step (i.e., as they approach the positions shown in FIG. 1) one of them operates a micro switch, not shown, which actuates the hydraulic cylinder 470 to lower the plunger 469. As the plunger is lowered it operates the previously mentioned clutch operating microswitch to disengage the clutch, and the plunger then enters a slot 471 in the boss 472 to arrest and hold the loader stationary. The hydraulic cylinder 420 is then actuated to raise the read head device 418 to a position adjacent the tool magazine on the lower vertical paddle (shown as 445), the device 418 having an upper read head to read the identifying number of the magazine. If the number so read is not that of the tool magazine required to be fed into the machine tool, an on-line computer on receipt of the signal fed back as indicative of the number read, operates through a machine function control of the machine tool to actuate the hydraulic cylinder 470 and commence another 72° rotational step, such steps continuing until the required tool magazine is at the lower vertical position. When the number read by the device 418 is that of the magazine to be fed into the machine tool, the signal fed back on such reading initiates the operation of mechanism described below to feed the magazine into the machine tool. The paddle from which the magazine is fed remains in the lower vertical position until it receives the magazine back from the machine tool, when the magazine number is again read, indicating that the loader can then be rotated (after lowering the read head device 418) to place the next required magazine in the lower vertical position.

The switches 459–463 provide feed back signals indicative of the positions of the paddles, determined by which of the switches is operated, and if desired these signals could be used, as described previously in relation to the pallet loader, to initiate rotational steps until the paddle carrying the required magazine is at the lower vertical position, the magazine number then being read as a check and to initiate feeding of the magazine into the machine tool. In this case provision could be made, as also described in relation to the pallet loader, to override the switch 457 so that the loader comes to rest only when the required paddle is at the lower vertical position.

The provision of a magazine loader capable of carrying five tool magazines, each of which magazines holds twenty eight tools, enables 140 tools to be readily available at the machine tool, which means, in the case of a twin spindle machine, that there are 70 tools available to each spindle. The tool magazines on the loader can, when required, be changed automatically by means of a transporter in a manner as described in the above mentioned application, the loader being rotated, if necessary, to place a paddle carrying a tool magazine which is to be withdrawn at the lower vertical position for collection by the transporter. The transporter then delivers this magazine to a magazine rack, from which it collects the newly required magazine and delivers it to the empty paddle of the magazine loader.

Figure 4:
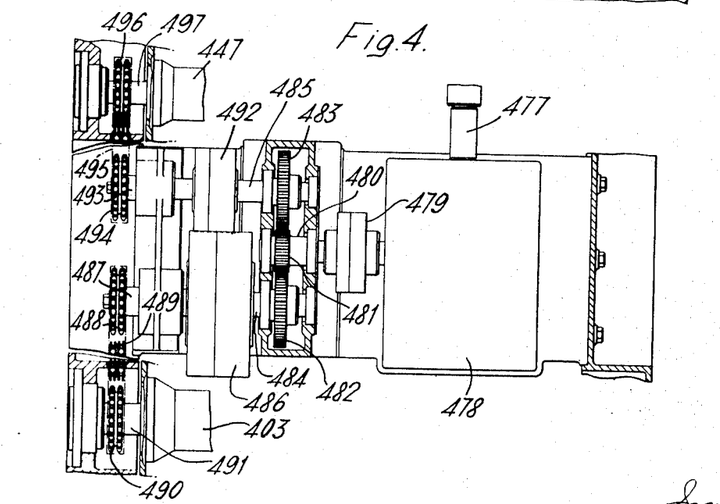
FIG. 4 is a sectional view through drive mechanism for the loading unit shown in FIG. 1.

The driving means for the pallet and tool magazine loaders is shown in FIG. 4. It comprises a hydraulic motor, adapted to operate at two speeds, having an output shaft 477 which drives, through a reduction gear box 478, a coupling 479. The coupling connects with a shaft 480 carrying a gear 481 which meshes with gears 482 and 483 mounted respectively on shafts 484 and 485.

The shaft 484 can, through a clutch 486, drive a shaft 487 carrying a sprocket 488 which drives a chain 489 passing round a sprocket 490 on a stub shaft 491 connected to the shaft 403 of the pallet loader. The shaft 485 can, through a clutch 492, drive a shaft 493 carrying a sprocket 494 which drives a chain 495 passing round a sprocket 496 on a stub shaft 497 connected to the shaft 447 of the tool magazine loader. Tensioning sprockets 498 and 499 (see FIG. 1) are provided for the chains 489 and 495 respectively.

The pallet loader and magazine loader can thus be driven independently, by appropriate engagement or disengagement of their respective clutches, from a common motor.

The means for transferring pallets and tool magazines between the machine tool and the pallet loader and between the machine tool and the magazine loader respectively is shown in FIGS. 5, 6, 7, 8 and 9. It comprises a beam 501 carried between pairs of opposed rubber rollers 502–507 (FIG. 5) of which the roller 505 is driven by a spindle 508 (see FIG. 7) having an extendable connection 509 to a shaft 510 which is driven through a connection 511 by an output shaft 512 of a motor 513, which may be a hydraulic motor. The shaft 510 has slidably keyed to it a gear 514 which meshes with a gear 515 similarly slidably keyed to a shaft 516 which drives, through an extendable connection 517, a spindle 518 on which the roller 504 is mounted. The connections 509 and 517 are such as to permit drive to be transmitted to the spindles 508 and 518 notwithstanding slight misalignment between these spindles and the shafts 510 and 516 which drive them, such misalignment permitting tensioning of the rollers against the beam. The connections 509 and 517 and the gears 514 and 515 are contained in a housing 519 mounted on a frame 520 in which bearings 521 and 522 are provided for the spindles 508 and 518. These spindles carry pulleys 523 and 524 respectively which drive rubber belts 525 (see FIG. 6) passing round similar pulleys 526 carried on spindles on which the rollers 502 and 503 are mounted. Thus, rotation of the output shaft 512 of the motor 513 drives the four rollers 502, 503, 504 and 505 which move the beam lengthwise. The motor is of variable speed, thus effectively having two speeds, and is reversible so that the beam 501 can be moved in either direction. The rollers 506 and 507 are idlers, and further idler rubber rollers 527–530 (FIG. 5) are provided in the machine tool to receive the beam, the rollers 502–507 being positioned between the machine tool and the pallet and tool magazine loaders.

Figure 7:
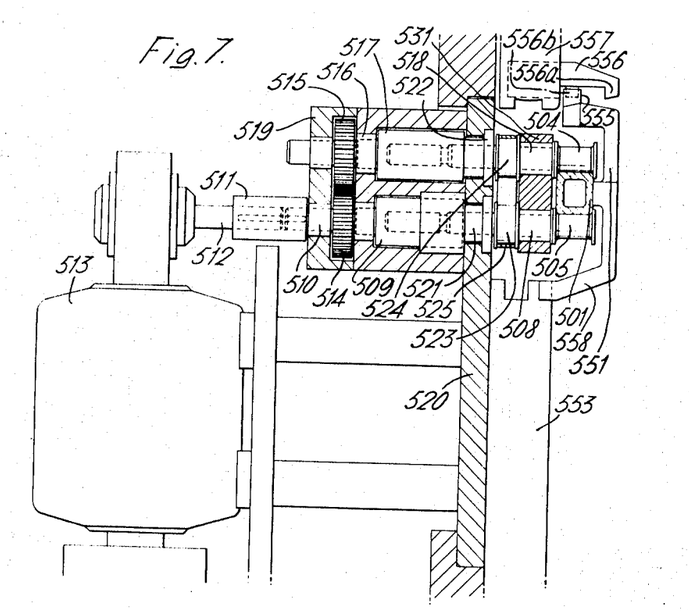
FIG. 7 is a sectional view on the line VII—VII of FIG. 5.
Figure 8:
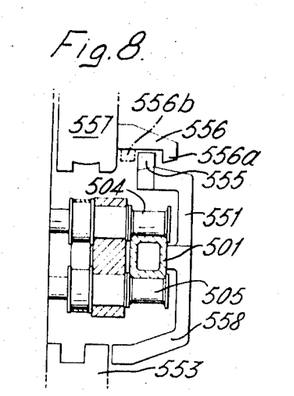
FIG. 8 is a view like FIG. 7 showing some parts in different positions.
Figure 9:
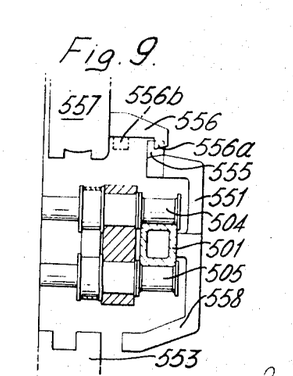
FIG. 9 is a view like FIG. 8 showing some parts in other different positions.

The spindles of the rollers 502–507 pass through a member 531 which can be moved to occupy any of three positions at different distances from the frame 520, the three positions being shown respectively in FIGS. 7, 8 and 9. The member 531 is moved by a pneumatically operated device shown in FIG. 6 and comprising a cylinder 532 containing a piston 533 having a piston rod 534, the end of which is secured to the member 531 by a setscrew 535, and a second and separate piston 536 which can push against the piston 533 and has two stepped portions 536a and 544. The cylinder 532 has a cylinder head 532a which has an air connection 537. The cylinder 532 has air connections 538 and 539. The connections 537, 538 and 539 communicate respectively with the space between the second piston 536, and the cylinder head 532a, an annular space between the stepped portion 536a of the second piston and the piston 533, and a space round the piston rod 534. The pistons have seals 540, 541 and 542 and the cylinder is provided with a shoulder 543 against which the step 544 on the second piston 536 can abut to limit its movement. An exhaust hole 545 is provided adjacent the shoulder 543.

Figures 5, 6:
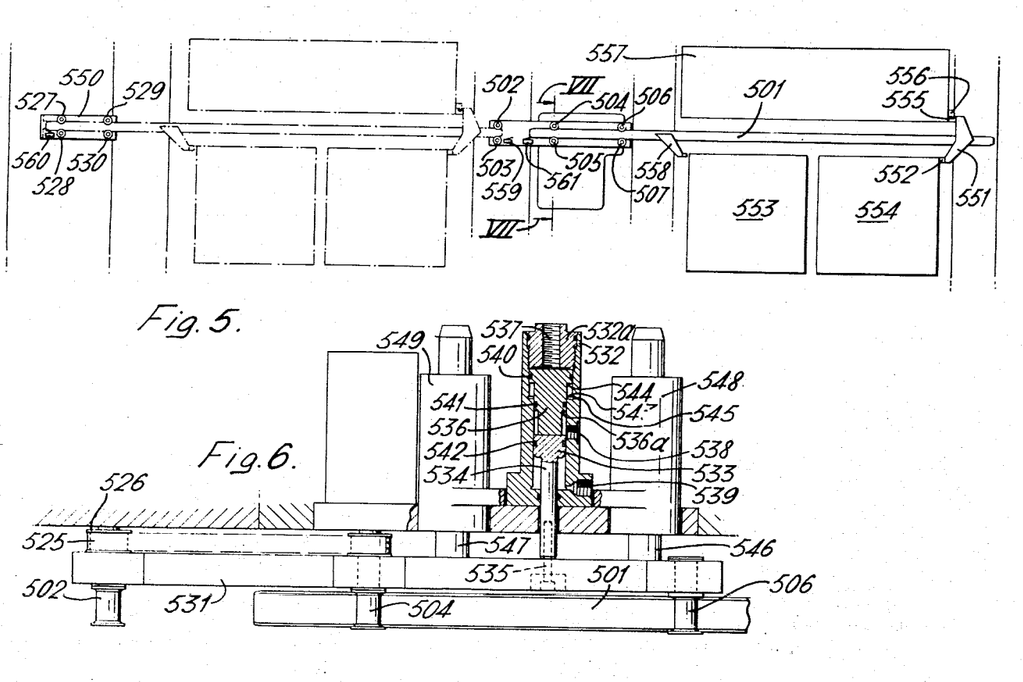
FIG. 5 is a diagrammatic front elevational view of transfer devices for transferring pallets and tool magazines between the loading unit shown in FIG. 1 and its associated machine tool.
FIG. 6 is a plan view, partly in section, of some of the devices shown in FIG. 5.

In FIGS. 6 and 7 the member 531 is shown in its innermost position. To move it to its central position (FIG. 8) air under pressure is introduced through the inlet 537 so pushing the piston 536, and hence the piston 533 and rod 534 outwardly (i.e., downwardly in FIG. 6) until the step 544 abuts against the shoulder 543 (air being exhausted through the hole 545 and the inlets 538 and 539). To move the member 531 to its outermost position (FIG. 9) air under pressure is introduced through the inlet 538 (air being exhausted through the inlet 539) so pushing the piston 533 and rod 534 out to the full extent of its travel. Introduction of air under pressure through the inlet 539 returns the piston 533 and hence the member 531 to its central position (air being exhausted through the inlet 538) at which it abuts the piston 536, and further air introduced through the inlet 539 moves both pistons back to their positions shown in FIG. 6 (exhaust taking place through both the inlets 537 and 538) where member 531 is at its innermost position. Guide rods 546 and 547, slidable in fixed guides 548 and 549 and fixed to the member 531, maintain its alignment. Thus, the beam 501 can be moved to any of its three positions relative to the frame 520 by appropriate operation of the pneumatic device, a similar device which operates in parallel (not shown) being provided to cause corresponding movement of a member 550 (FIG. 5) on which the idler rollers 527-530 are mounted.

The beam 501 carries a projection 551 (FIGS. 5, 7, 8 and 9) having a lower arm whose tip 552 (FIG. 5) can, when the beam is at its innermost position (FIG. 7), engage against the end of a pair of pallets 553 and 554 carried on a paddle of the pallet loader at its upper vertical position. The beam 501 carries a further single arm projection 558 spaced from the projection 551 so that its tip can, when the beam is at its inner position, engage against the other end of the pair of pallets 553 and 554 when they are to be fed from the machine tool on to the loader. In FIGS. 7, 8 and 9 the tip 552 is concealed behind the arm 558. The presence of the member 556b shown chain dotted in FIGS. 7, 8 and 9 should be ignored for the present. The projection 551 also has a second and upper arm whose tip 555 can, when the beam is at its outermost position (FIG. 9), engage in a U-shaped hook 556a of an arm 556 on a tool magazine 557 carried on a paddle of the tool magazine loader at its lower vertical position. Thus, the tip 555 acts to move the magazine 557 either into, or out of, the machine tool. When the beam 501 is in its central position (FIG. 8) its projections are clear of both magazine tool and pallets.

The operation of the mechanism is as follows. When a pair of pallets is to be transferred from the upper vertical paddle of the pallet loader into the machine tool, the beam 501 is moved from its central position as in FIG. 8 (at which it normally rests) to its innermost position (as in FIG. 7) at which the tip 552 of the projection 551 can engage the end of the pair of pallets. The motor 513 then operates, initially at its higher speed, to move the beam, and hence the pallets, across into the machine tool (i.e., to the left as viewed in FIG. 5). When the trailing end of the beam releases a switch 559 on the member 531 the motor is caused to operate at its lower speed, and when the leading end of the beam engages a second switch 560 on the member 550 the motor is stopped and/or a brake is applied. The beam and pallets then occupy the positions shown in broken line in FIG. 5 in the machine tool. The beam is then moved to its central position as in FIG. 8 (to move the arm 558 clear of the pallets) and is withdrawn from the machine tool by driving the motor in the reverse direction at its higher speed until the trailing end of the beam releases the switch 559, when it operates at its lower speed until the trailing end of the beam releases a third switch 561 on the member 531 which stops the motor and/or applies a brake.

When a pair of pallets is to be transferred from the machine tool to the upper vertical paddle of the paddle loader, the reverse procedure is followed, i.e., the beam, in its central position, is moved into the machine tool and is then moved to its innermost position so that the arm 558 can engage the other end of the pair of pallets before it is moved out of the machine tool (to the right as viewed in FIG. 5) with the arm 558 pushing the pallets, the switches operating as before.

The transfer of a tool magazine from the lower vertical paddle of the magazine loader to the machine tool occurs in a similar manner but with the beam moved to its outermost position (FIG. 9) so that the tip 555 of the projection 551 engages with the hook 556a of the arm 556 on the magazine, this tip and hook being so arranged that their engagement can push the magazine into or pull the magazine from the machine tool. Thus, a magazine change can be effected both before the commencement of, or during, a machining operation.

As described, pallets and tool magazines are moved into or out of the machine tool separately since the beam has to be in different positions to effect transfer of a magazine and pallets respectively. However, it may be desired to be able to move the tool magazine and the pair of pallets into, or out of, the machine tool simultaneously. In this case, the arm 556 on the tool magazine is provided with a further U-shaped hook 556b, similar to the hook 556a, and shown in chain-dotted line in FIGS. 7, 8 and 9. The hook 556b is positioned along the arm 556 so that the tip 555 engages in it when the beam is in its innermost position, shown in FIG. 7, and so that the tip 555 is disengaged from the hook 556b when the beam 501 is in its central position (FIG. 8). When the beam 501 is in its innermost position (FIG. 7), a magazine and a pair of pallets may be moved into the machine tool, or removed therefrom simultaneously. This would occur respectively before and after a machining operation is carried out on the workpieces on the pallets. If it is necessary to change tool magazines during a machining operation, the beam 501 is moved to its outer position (FIG. 9) so that the magazine can be withdrawn from the machine tool and another one pushed into the machine tool whilst the pallets remain in the machine tool.

The pallets are supported during their transfer on rollers running in "T" slots in the base of the pallets not shown in FIGS. 5 to 9 and the tool magazine is supported by rollers running in side grooves in the magazine, such rollers similarly not being shown in these figures.

Loading and Machining Operational Cycle.

The cycle of operations performed by the loading unit and machine tool to machine the workpieces on one pair of pallets will now be described.

After rotation of the pallet loader through a 270° stage which places the paddle carrying the pair of pallets at the upper vertical position, the pallets' number is read. The signal fed back indicative of this number is effective to interrogate an on-line computer to ascertain the identifying number of the tool magazine required, and the machining programme tape cassette number required for machining of the workpieces. The signal also initiates operation of the beam 501 by a machine function control to move it to its inner, pallet-engaging, position and then to feed the pair of pallets into the machine tool, after which the beam is moved to its central, "neutral," position and withdrawn. On arrival in the machine tool the pallets are automatically shuffled into accurate position by devices as described in U.S. Pat. No. 3,243,178. On receipt of the required tool magazine number from the computer the machine function control effects rotation of the tool magazine loader to place the paddle carrying the required tool magazine at the lower vertical position (unless the read head indicates that the required magazine is already at that position), where the tool magazine number is read. When the signal indicative of this number is fed back the machine function control operates the beam 501 to move it to its outer, magazine-engaging, position and then to feed the tool magazine into the machine tool, after which the beam is moved to its central, "neutral," position and withdrawn. On receipt of the required tape cassette number from the computer, the machine function control selects the required tape from a random access tape store and places it on a tape deck, as described in U.S. Pat. No. 3,484,055 to Raine. When signals indicative of both accurate pallet location in the machine tool and correct tape location on the tape deck are received the machine function control starts the tape and the machine tool performs its machining operations in accordance with the tape programme until an "end of tape" signal is fed back from the tape deck. On receipt of this signal the machine function control operates the beam 501 to feed it into the machine tool, move it to its inner, pallet-engaging position, and then withdraw it to feed the pair of pallets back on to the pallet loader paddle from which they came. After being moved to its central, "neutral," position the beam 501 is again fed into the machine tool, moved to its outer, magazine-engaging, position and withdrawn to feed the tool magazine back on to the magazine loader paddle from which it came, the beam then being returned to its central, "neutral," position. The numbers of the pallets and the tool magazine are read after they are returned to their respective paddles, and on receipt of signals indicative of these numbers the machine function control initiates rotation of the pallet loader through a further 270° stage to place the pair of pallets whose workpieces have just been machined at the right hand horizontal position, as viewed in FIG. 1, from which they can be withdrawn by the transporter previously mentioned, and to place the next pair of pallets to be fed into the machine tool at the upper vertical position, ready for commencement of another cycle.

Where the machining operations to be performed on a pair of workpieces require more than one tool magazine to provide the necessary tools, the tape program issues a "change magazine" signal at the required time and then stops. This signal causes the machine function control to operate the beam 501 so that it is fed into the machine tool, then moved to its outer position at which it engages the tool magazine and is clear of the pallets in the machine tool, and then withdrawn to feed the tool magazine from the machine tool on to the paddle of the magazine loader from which it came. The signal is also effective to interrogate the on-line computer to ascertain the identifying number of the newly required tool magazine. After the withdrawn magazine is received on the loader and the beam 501 moved to its "neutral" position the function control, having received the newly required magazine number from the computer, rotates the magazine loader until the newly required tool magazine is at the lower vertical position. When the required number is read at this position, the beam 501 is operated to move to its outer, magazine-engaging, position and feed the new tool magazine into the machine tool, the beam then being moved to its neutral position and withdrawn. The tape restarts so that the machine tool continues its machining operations using tools from the newly delivered magazine.

If the arms 556 of the tool magazines are each provided with a further hook 556b, as described in the alternative above, so that at the inner position of the beam 501 both a tool magazine and a pair of pallets can be engaged and moved simultaneously, the above described cycle of operations is modified. The function control waits until the required tool magazine is at the lower vertical position before operating the beam, and then moves the beam to its inner position to feed the pair of pallets and the tool magazine simultaneously into the machine tool, after which the beam is moved to its central, "neutral" position and withdrawn. Similarly, after completion of the machining operations and on receipt of the "end of tape" signal, the machine function control feeds the beam into the machine tool, moves it to its inner position, and withdraws it to feed the pair of pallets and the tool magazine simultaneously back on to their respective paddles, after which the beam is moved to its central, "neutral," position. The beam is then only moved to its outer position, at which it engages only a tool magazine, when a magazine change is effected in the manner described above.

Figure 10:
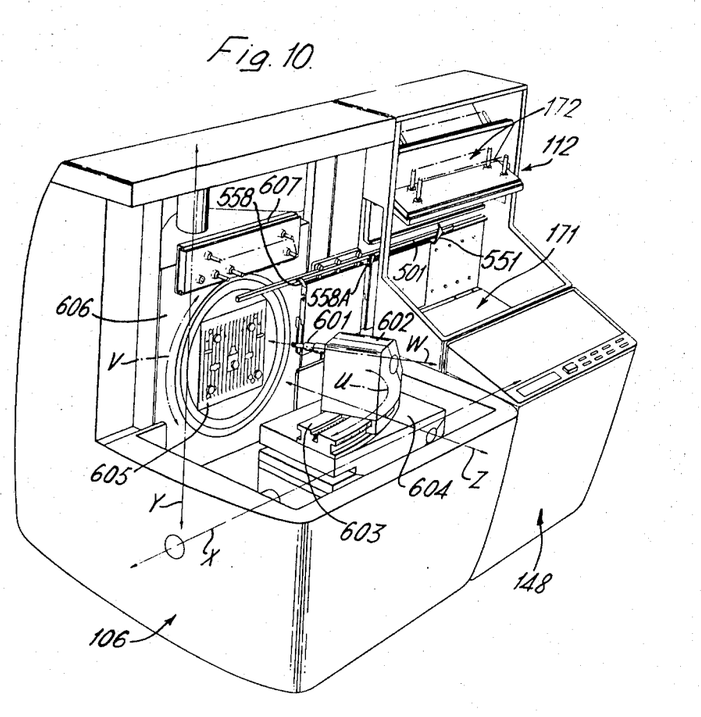
FIG. 10 is a perspective view of a 6-axis single spindle machine tool and an associated loading unit comprising a pallet loader and a tool magazine loader.

The pallet loader described above can be modified for association with a single spindle machine. FIG. 10 shows a six-axis numerically controlled machine tool 106 having a single spindle 601 mounted in a head 602 which is movable along an arcuate guide 603 on a main support member 604. A pallet loaded with a workpiece to be machined is received on a vertical backing plate 605 (provided with devices as disclosed in U.S. Pat. No. 3,243,178 for shuffling the pallet accurately into position relative thereto) carried on a support 606, which can be moved vertically. The backing plate 605 is rotatable in a vertical plane relatively to its support 606. Above the backing plate 605 is a holder 607 for a tool magazine from which a tool can be selected for use in the spindle 601. The six axes of movement are achieved (i) by horizontal movement of the support member 604 in the direction indicated by the arrow X; (ii) by vertical movement of the support 606 (and hence of the backing plate 605) as indicated by the arrow Y; (iii) by horizontal movement of the support member 604 in the direction indicated by the arrow Z; (iv) by movement of the head 602 relative to the guide 603 in a horizontal arc as indicated by the arrow U; (v) by rotational movement in a vertical plane of the backing plate 605 relative to its support as indicated by the arrow V; and (vi) by movement of the spindle 601 to project further or less from the head 602 as indicated by the arrow W.

Figure 11:
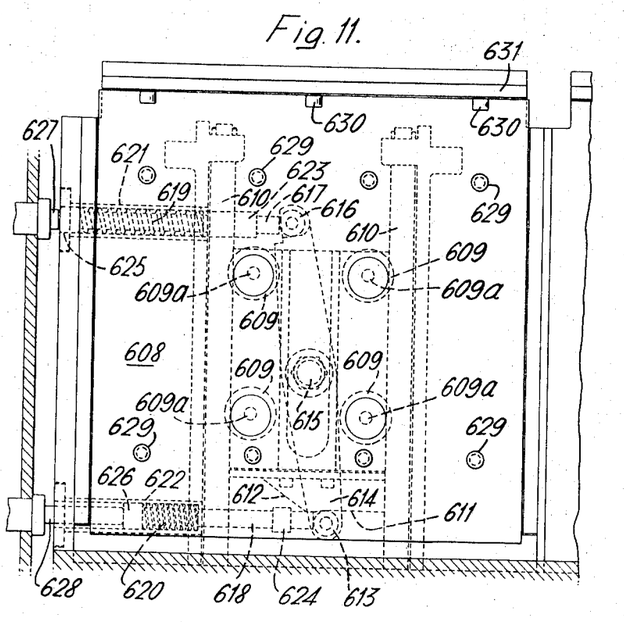
FIG. 11 is a front elevational view of part of the pallet loader shown in FIG. 10.
Figure 12:
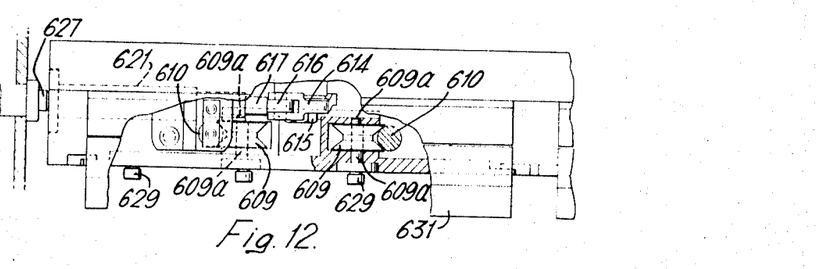
FIG. 12 is a plan view partly in section, of mechanism shown in FIG. 11.

The pallet loader associated with the single spindle six-axis machine differs from that described above for a twin spindle machine tool in that each of the paddles of the single spindle machine pallet loader is split into two halves, and the half nearer to the machine tool is provided with mechanism, shown in FIGS. 11 and 12, for unlinking and re-linking the pallets of a pair delivered to the pallet loader so that the pallets can be fed into the machine tool one at a time.

Each paddle-half 608 adjacent the machine tool is movable relatively to the other half, and carries behind it (as viewed in FIG. 11) four rollers 609, each having a peripheral "V" groove (see FIG. 12), which can run along two rails 610 which are fixed to a part of the paddle loader relatively to which the paddle-half 608 is movable. The rollers 609 are free to rotate on shafts 609*a* which are themselves carried by eccentric stubs 609*b* (FIG. 12) for initial adjustment of the position of the shafts to ensure good location of the rollers 609 against the rails 610. The paddle-half 608 also carries behind it (as viewed in FIG. 11) an element 611 providing a cam track 612 along which can run a roller 613 mounted at one end of an arm 614 which is movable about a fixed central pivot 615. At the other end of the arm 614 is mounted a further roller 616. Pusher rods 617 and 618 carrying springs 619 and 620 contained in fixed housings 621 and 622 are arranged to bear against the rollers 616 and 613 respectively, the rods 617 and 618 being provided respectively with stops 623 and 624 to limit their movement relatively to the housings, and end heads 625 and 626 to contain the springs.

At the position where a pallet is fed into the machine tool, i.e., when the paddle carrying the pallet is in its upper vertical position (which is the same paddle position as that at which pallets are delivered from the machine tool to the paddle), there are provided two hydraulically operated rams 627 and 628 which can respectively engage against the end heads 625 and 626 to operate the pusher rods 617 and 618. In FIG. 11 the ram 628 is shown extended and the ram 627 is shown retracted, so that the arm 614 assumes the position illustrated at which the roller 613 supports the element 611, and hence the paddle half 608, in its raised position. If the ram 628 were now retracted and the ram 627 extended, the pusher rod 618 would, under the action of the spring 620, move to the left as viewed in FIG. 11 and the pusher rod 617 would move to the right pushing the roller 616 and causing the arm 614 to rotate clockwise about its pivot 615. The roller 613 would then run up the cam track 612 permitting the element 611, and hence the paddle-half 608 to drop to its lower position. Reversal of the operation of the rams 627 and 628, i.e., extension of the ram 628 and withdrawal of the ram 627, would cause the parts to re-assume their positions shown in FIG. 11 thus again raising the paddle half 608. Operation of the rams 627 and 628, which is automatically controlled in timed relationship to the feeding of pallets into and from the six-axis machine tool, thus raises and lowers the paddle-half 608. The vertical up and down movement of the paddle half 608 is guided by the rollers 609 running up and down the rails 610.

The paddle half 608 is provided with rollers 629, which run in "T" slots provided in the base of the pallets as previously described, so that movement of the paddle-half 608 causes corresponding movement of a pallet carried thereby. Further rollers 630 are mounted along a fixed top guide 631 and run in slots along the side of the pallets. When the paddle-half 608 is in its raised position (as shown in FIG. 11) a pallet carried thereby is aligned with the other pallet of a linked pair carried by the other paddle-half, and the extent of movement of the paddle-half 608, i.e., the distance it moves down to its lower position, is sufficient to disengage the links of the two pallets.

Figure 13:
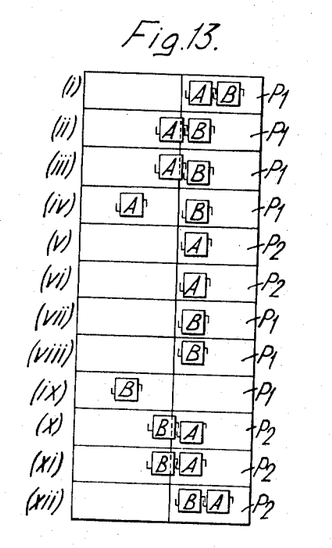
FIG. 13 is a diagrammatic representation of the movement of pallets by mechanism shown in FIGS. 10, 11 and 12.

FIG. 13 shows diagrammatically the relative movements of the pallets of a linked pair delivered to the paddle loader of the single spindle six-axis machine tool. In this figure the right hand column represents the pallet loader and the left hand column the machine tool, while the rows show different positional stages of the pallets which are, for convenience, indicated as A and B.

Stage (i) shows the pair of linked pallets which have been delivered from a pallet store by a transporter (in a manner as described in U.S. Pat. application Ser. No. 695,817 on to a paddle (indicated as P1) of the pallet loader with pallet A leading.

At stage (ii) the paddle carrying the pallets is in its upper vertical position, at which a pallet can be fed into the machine tool, and the pallets are moved towards the machine tool (by means of a beam 501 as previously described) until the pallet B occupies the position occupied in stage (i) by pallet A, i.e., so that pallet B is carried on the paddle half 608 adjacent the machine tool, and pallet A has moved part way into the machine tool. The pallets are shown at stage (ii) in FIG. 10 in which the beam 501 that moves the pallets can clearly be seen. The beam 501 in the six-axis machine loading unit has, in addition to the pusher elements 551 and 558 previously described, a further pusher element 558A located approximately midway between the elements 551 and 558. This further pusher element 558A can engage behind the leading pallet of a pair as considered in the direction of feed into the machine tool, i.e., can engage against pallet A.

At stage (iii) pallet B has been lowered (by operation of the hydraulic ram 627 and resultant lowering of the paddle-half 608) to disengage the links connecting the pallets.

At stage (iv) pallet A has been moved across (by the pusher element 558A on the beam previously described) into the machine tool for machining of the workpiece loaded on the pallet, pallet B remaining in its lower position.

After stage (iv) both the hydraulic rams 627 and 628 are withdrawn to enable the pallet loader to be rotated to locate an empty paddle (indicated as P2) in the upper vertical position at which it can receive the pallet A from the machine tool after machining, the paddle-half 608 of the paddle P2 being in its raised position so that the pallet A (moved by the beam) is received thereon as shown at stage (v).

At stage (vi) the ram 627 has been operated to lower pallet A on paddle P2, and both rams are then withdrawn, again to permit rotation of the pallet loader.

The pallet loader is rotated to re-locate the paddle P1 at the upper vertical position, pallet B still being (from stage (iv)) in its lower position as shown at stage (vii).

At stage (viii) the hydraulic ram 628 has been operated to raise the pallet B for transfer into the machine tool. The beam is then operated to effect such transfer, the pusher element 558A engaging behind pallet B and pushing it into the machine tool for machining operations as shown at stage (ix).

Both rams are withdrawn and the paddle loader rotated to re-locate paddle P2, which carries pallet A in its lower position (from stage (vi)), for receipt of pallet B from the machine tool after machining. Pallet B is then moved (by the beam) to a position adjacent pallet A as shown at stage (x).

The hydraulic ram 628 then operates to raise pallet A and connect it to pallet B by engagement of their links as shown at stage (xi).

At stage (xii) the pair of linked pallets have been moved across (by the beam) on to the paddle P2 ready for transfer therefrom by the transporter back to the pallet store.

As explained above, the hydraulic rams 627 and 628 are both withdrawn when the pallet loader is rotated, and to ensure that a pallet is in the correct desired (raised or lowered) position when the paddle carrying that pallet is at the upper vertical delivery and receipt location, the appropriate ram is operated even when the pallet was at the correct desired position when the paddle was last at that location prior to rotation. Thus, for example, although pallet A is at its lower position on paddle P2 at stage (vi) and the pallet loader is rotated to subsequently return paddle P2 to the upper vertical location at stage (x) when it is desired that pallet A should still be in its lower position, the ram 627 is operated when paddle P2 returns to the upper vertical location to ensure that pallet A is in fact in the desired lower position for stage (x).

The tool magazines used in the six-axis single spindle machine tool 106 are generally of the same shape and size as those used on the twin spindle machine but do not carry as many tools. The six axis machine tool magazines have thirteen sockets 451 (see FIG. 2) arranged in two rows, each socket being adapted to hold one tool. Thus sixty five tools are readily available to the single spindle of each of the six axis machines by reason of their tool magazine loaders being capable of carrying five tool magazines (one on each paddle) each containing thirteen tools.

It will be appreciated that the specific mechanisms and devices described above are given by way of illustration and example. In particular, a different form of mechanism could be used to effect unlinking of the pallets of a pair on the loading unit of the six-axis single spindle machine. Further, different mechanism could be used to effect the desired rotation and stopping of the pallet and tool magazine loaders, for example mechanism as described in U.S. Pat. application Ser. No. 769,146 filed Oct. 21, 1968, in the name of Williamson. Also, the third pusher element 558A on the beam 501 in the loading unit of the six-axis single spindle machine could, if desired, be included on the beam in the loading unit of the twin spindle machine, this pusher element engaging behind the leading pallet of a pair being fed into the machine tool and serving to maintain the required pitch of the pallets.

We claim:

1. A loading unit for loading articles such as workpieces and tools into and unloading them from a machine tool comprising
   a. support means for supporting said articles for movement along at least two paths into and out of the machine tool, said paths being substantially parallel to each other and defining a first plane,
   b. article storage means for storing a plurality of said articles, said article storage means including means for positioning any of the articles from said plurality of articles at a first location at one end of each of said paths of said support means and for withdrawing articles from said first location,
   c. pusher means, and
   d. means for moving said pusher means in a direction parallel to said paths and first plane and for moving said pusher means in a direction transversely thereof in a second plane to locate said pusher means at a plurality of predetermined lateral positions, said second plane being transverse to said first plane,
   e. said pusher means being adapted to move articles disposed in a selected one of said paths in said first plane when moved in said direction parallel to said paths by locating said pusher means in a selected one of said lateral positions in said second plane,
   f. whereby said pusher means may selectively move articles between said first location at one end of each of said paths and a second location at the opposite end of each of said paths.

2. A loading unit as claimed in claim 1 wherein said pusher means comprises a movable member and a plurality of pusher elements, each pusher element being positioned on said movable member to move an article in a selected one of said paths with the location of said movable member in a selected one of said lateral positions.

3. A loading unit as claimed in claim 2 wherein each pusher element is positioned on said movable member to move an article in only one of said paths in said first plane when said movable member is in only one of said lateral positions in said second plane without movement of articles in other paths by other pusher elements.

4. A loading unit as claimed in claim 2 wherein the number of predetermined lateral positions in said second plane to which said movable member is moved by said moving means is one more than the number of parallel paths in said first plane, no pusher elements being positioned on said movable member to move an article when said movable member is in said one more lateral position, whereby said movable member may be moved in said direction parallel to said paths but free of any of said articles.

5. A loading unit as claimed in claim 1 wherein said second plane in which said predetermined lateral positions are located is perpendicular to said first plane defined by said parallel paths along which said articles are moved.

6. A loading unit as claimed in claim 1 wherein said article storage means comprises a rotary storage device for each of said paths of said support means, each of said rotary storage devices including a plurality of article retaining means for retaining a plurality of articles about the axis of the rotary storage device.

7. A loading unit as claimed in claim 6 further comprising indexing means for rotating each of said rotary storage devices and locating any one of said article retaining means of each rotary storage device at the first location of each respective path of said support means.

8. A loading unit for loading workpieces and tools into and unloading them from a machine tool while mounted on article holders and comprising
   a. at least one article holder of a first type,
   b. at least one article holder of a second type including projection means,
   c. first support means for supporting said article holder of the first type for movement along a first path into and out of the machine tool,
   d. second support means for supporting said article holder of the second type for movement along a second path into and out of the machine tool, said first and second paths being substantially parallel to each other and defining a first plane, e. a longitudinally extending beam, f. means mounting said beam for movement in the direction of its length substantially parallel to said first and second paths and said first plane, and for movement transversely thereof in a second plane, said second plane being transverse to said first plane, g. first reversible means for moving said beam in said parallel direction into and out of the machine tool, h. second reversible means for moving said beam in said transverse direction in said second plane to locate the beam selectively at any one of three consecutive lateral positions, i. said beam having at least one first pusher element and a second pusher element extending transversely of said beam, j. said first pusher element being positioned on said beam to engage an article holder of said first type in said first path only while said beam is in one of said lateral positions, k. said second pusher element being positioned on said beam to engage said projection means on an article holder of the second type in said second path only while said beam is in one and another of said lateral positions, l. whereby both said article holders of the first and second types may be moved simultaneously by moving said beam longitudinally in said one of said lateral positions, only said article holder of the second type may be moved by moving said beam longitudinally in said another of said lateral positions, and said beam may be longitudinally moved independently of said article holders in said last of said lateral positions.

9. A loading unit as claimed in claim 8 further comprising a plurality of rollers to support said beam, said first reversible means for moving said beam in the direction of its length comprising means to drive at least one of said rollers, and said second reversible means for moving said beam in a direction transverse to the longitudinal axis of the beam in said second plane comprising a movable member supporting said rollers.

10. A loading unit as claimed in claim 8 wherein said second plane defined by the transverse movement of said beam is perpendicular to said first plane defined by the first and second paths of said first and second support means respectively.

11. A loading unit for loading workpieces and tools into and unloading them from a machine tool while mounted on workpiece support elements and tool magazines respectively, comprising a. support means for supporting said workpiece support elements for movement along one path between a first transfer position at one end of said one path and a machining position at the opposite end thereof and for supporting tool magazines for movement along another path between a second transfer position at one end of said other path and a tool locating position at the opposite end thereof, said first and second paths being substantially parallel to each other and defining a first plane, b. pusher means for engaging and pushing said workpiece support elements and tool magazines along said first and second paths respectively, and c. means for moving said pusher means in a direction parallel to said path and first plane and for moving said pusher means in a direction transversely thereof in a second plane to locate said pusher means at any one of at least two lateral positions, said second plane being transverse to said first plane, d. said pusher means being adapted when in a first lateral position to engage and move at least one of said workpiece support elements in said one path and when in a second lateral position to engage and move one of said tool magazines in said other path, e. whereby said workpiece support elements and tool magazines may be selectively moved between said first and second transfer positions and said machining position and tool locating position respectively.

12. A loading unit as claimed in claim 11 wherein said pusher means is movable in said transverse direction in said second plane to a third lateral position, said pusher means being adapted when in said third position to simultaneously engage and move at least one of said workpiece support elements in said first path and one of said tool magazines in said second path.

13. A loading unit as claimed in claim 11 wherein said pusher means is movable in said transverse direction in said second plane to a further lateral position wherein said pusher means may be moved in said direction parallel to said paths without engaging workpiece support elements or tool magazines in said first and second paths.

14. A loading unit as claimed in claim 11 further comprising
a. storage means for storing a plurality of said workpiece support elements and tool magazines, said storage means including means for feeding and withdrawing any one of said plurality of workpiece support elements to and from said first transfer position and feeding and withdrawing any one of said plurality of tool magazines to and from said second transfer position, b. whereby said workpiece support elements and tool magazines may be transferred to and from said support means.

15. A loading unit as claimed in claim 14 wherein said storage means comprises a rotary storage device for each of said paths of said support means, said rotary storage devices including a plurality of retaining means for retaining a plurality of workpiece support elements and tool magazines respectively about the axis of the respective rotary storage device.

16. A loading unit as claimed in claim 15 further comprising indexing means for rotating each of said rotary storage devices and locating any one of said retaining means of each rotary storage device at said first and second transfer positions respectively.

17. A loading unit as claimed in claim 15 wherein each of said workpiece support elements includes means for releasably linking adjacent support elements together and each of said retaining means on the rotary storage device for said workpiece support elements is adapted for retaining a pair of said workpiece support elements and includes means for engaging and releasing the linking means of said pair of support elements, whereby only one of said pair of support elements is fed to said first transfer position.

18. A loading unit as claimed in claim 17 wherein said support elements are linked and unlinked by relative lateral movement of adjacent support elements, said rotary storage device comprises a rotatably mounted member, and each of said retaining means on the rotary storage device for said workpiece support elements comprises a radially extending paddle on said rotatably mounted member, each paddle being adapted for supporting a pair of said workpiece support elements and comprising two segments arranged such that only one of said pair of support elements is positioned on each segment and means for moving one of said segments relative to the other to link and unlink support elements retained on said paddle.

* * * * *